United States Patent
Peri et al.

(10) Patent No.: US 7,577,791 B2
(45) Date of Patent: Aug. 18, 2009

(54) VIRTUALIZED LOAD BUFFERS

(75) Inventors: Ramesh Peri, Austin, TX (US); John Fernando, Austin, TX (US); Ravi Kolagotia, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 11/620,502

(22) Filed: Jan. 5, 2007

(65) Prior Publication Data

US 2007/0112998 A1 May 17, 2007

Related U.S. Application Data

(62) Division of application No. 10/821,549, filed on Apr. 8, 2004, now Pat. No. 7,346,735.

(51) Int. Cl.
*G06F 12/00* (2006.01)
(52) U.S. Cl. .................. 711/118; 711/135; 711/138; 711/144; 711/156
(58) Field of Classification Search .............. None
See application file for complete search history.

(56) References Cited

U.S. PATENT DOCUMENTS 6,535,962 B1 * 3/2003 Mayfield et al. ............ 711/137

OTHER PUBLICATIONS

Jim Handy, The Cache Memory Book, 1998, Academic Press, Second Edition, pp. 16 and 47-48.*
David A. Patterson and John L. Hennessy, Computer Architecture A Quantitative Approach, 1996, Second Edition, p. 75.*

* cited by examiner

*Primary Examiner*—Matt Kim
*Assistant Examiner*—Shawn X Gu
(74) *Attorney, Agent, or Firm*—Trop, Pruner & Hu, P.C.

(57) ABSTRACT

A memory addressing technique using load buffers is described. More particularly, embodiments of the invention relate to a method and apparatus for accessing data in a computer system by exploiting addressing mode information within an instruction such that if present, data may be obtained from the load buffers, rather than accessing a cache memory or other memory device within the computer system.

17 Claims, 10 Drawing Sheets

VIRTUALIZED LOAD BUFFERS

This U.S. Patent application is a divisional of U.S. Ser. No. 10/821,549 issued Mar. 18, 2008 entitled "VIRTUALIZED LOAD BUFFERS" now U.S. Pat. No. 7,346,735.

FIELD

Embodiments of the invention relate to microprocessor architecture. More particularly, embodiments of the invention relate to a method and apparatus to improve cache performance in a microprocessor by exploiting address information in the program instructions.

BACKGROUND

In typical prior art computer systems, a processor may access data from memory by first checking to see whether a valid copy of the requested data exists within a cache, such as a level one (L1) cache. In order to determine whether a valid copy of the requested data is present within a cache line, the processor will typically perform a special operation, such as a snoop operation, to check the validity of a line of cache corresponding to a particular address. If the snoop returns a favorable result (e.g.,. a cache "hit"), the processor may then access the desired data from the line of cache memory. However, if the snoop results in an unfavorable result (e.g., a cache "miss"), the processor may have to resort to another memory source, such as main system memory, for the desired data.

Figure 1:
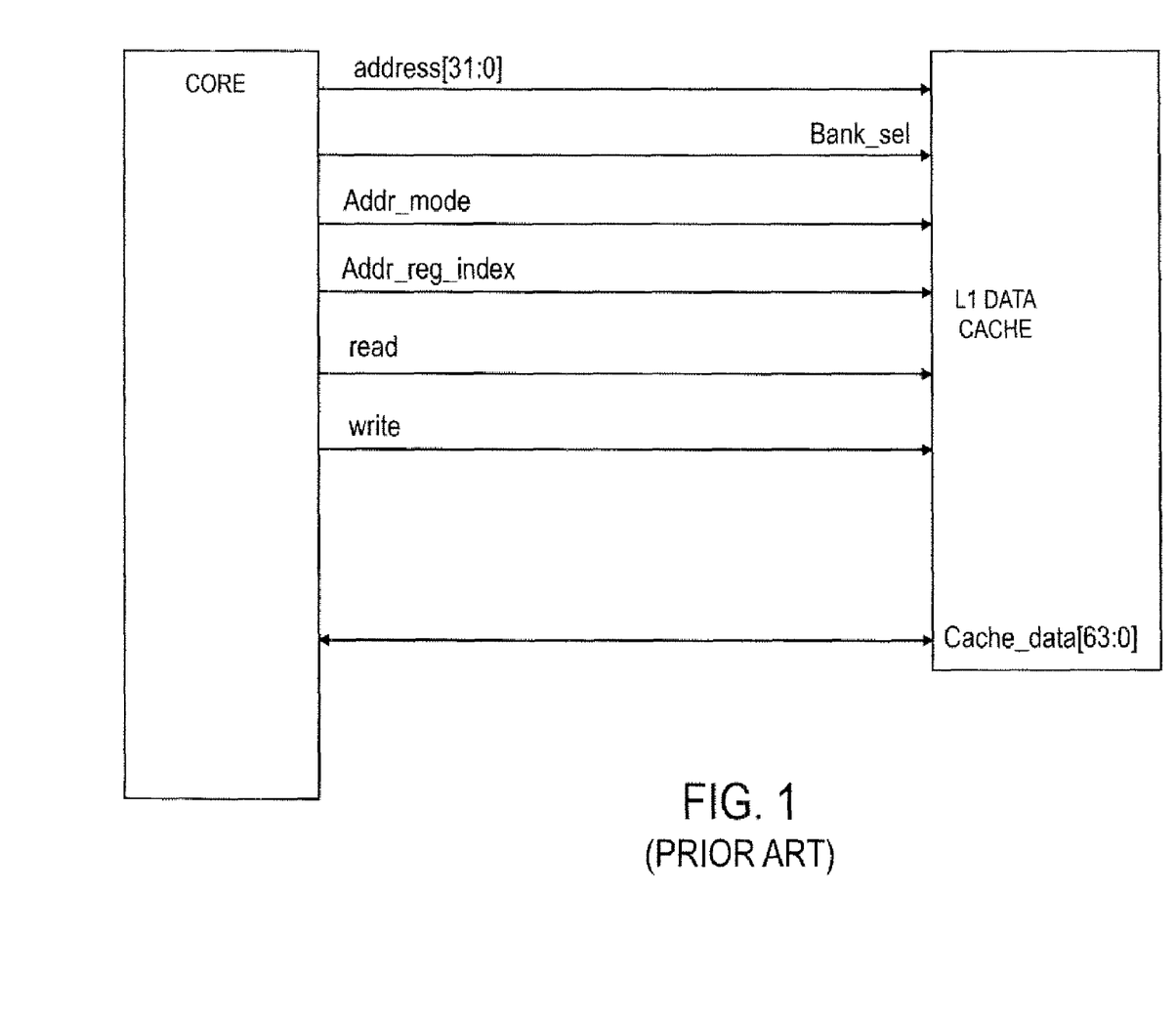
FIG. 1 illustrates a prior art cache architecture requiring a multiple operations to retrieve desired data from the cache.

In the either case, the snoop cycle may result in latency, because it is an extra operation that must be performed before accessing the desired data. FIG. 1 illustrates a prior art computer system in which a microprocessor, or processor core, accesses a cache that is internal or external to the processor package. The processor accesses the cache by addressing a cache line on the address lines, address[31:0]. A snoop operation first determines whether a valid copy of the desired data exists at the addressed cache line. If a valid copy of the data does exist, the data is then accessed by the processor via a read operation, which returns the requested data to the processor on the data lines, data[63:0]. However, if a valid copy of the desired data does not exist at the addressed location within the cache, the processor may have to access other memory, such as dynamic random access memory (DRAM), which may have slower access speeds, thereby resulting in even more computer system latency.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to microprocessor architecture. More particularly, embodiments of the invention relate to a method and apparatus to improve cache access performance in a computer system by exploiting addressing mode information within an instruction accessing a cache memory or other memory device within the computer system.

Computer system memory access latency is improved in at least one embodiment of the invention by using load buffers to store previously accessed cache data, such that a processor can access previously accessed data without incurring latency due to a cache snoop operation. In at least one embodiment of the invention, the buffers can be accessed by a processor using the same access cycles timing as for an access to a register file.

Figure 2:
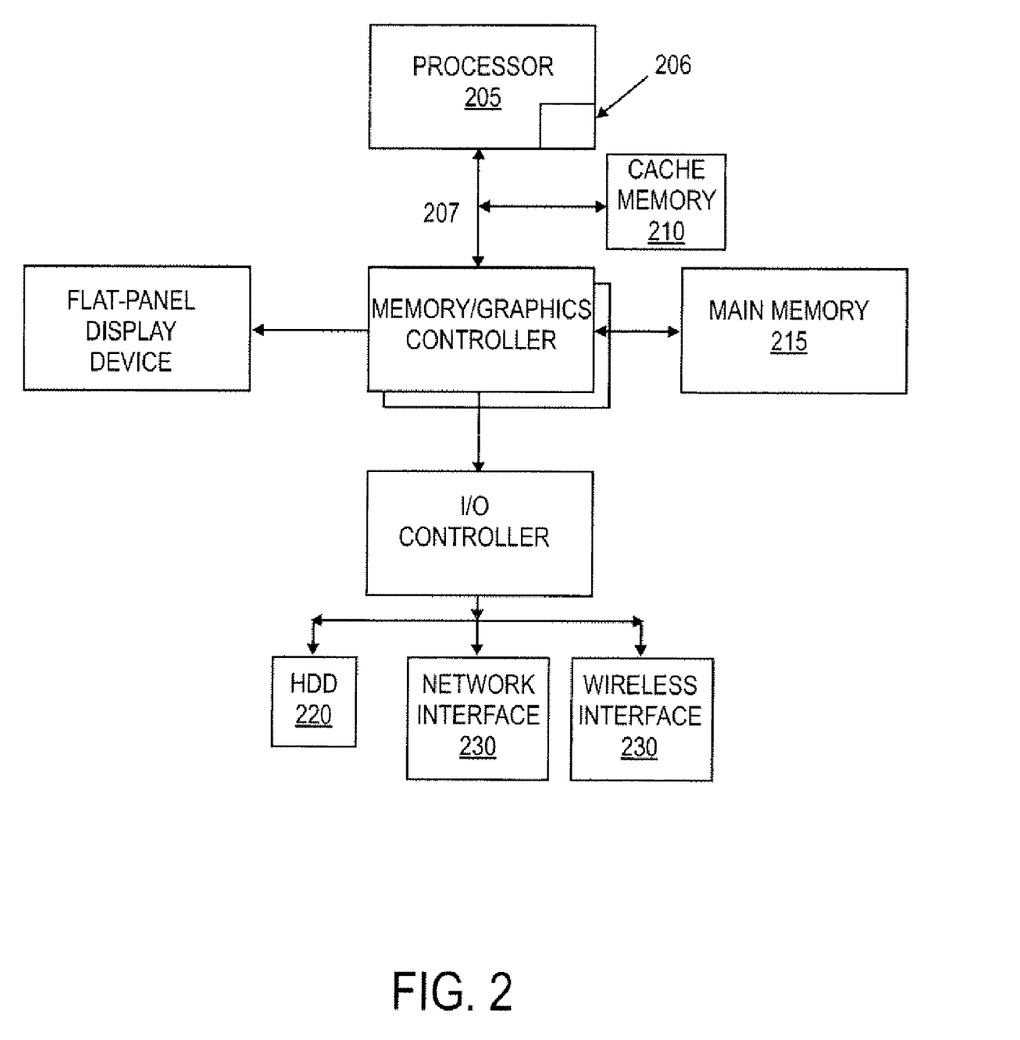
FIG. 2 illustrates a computer system in which at least one embodiment of the invention may be used.

FIG. 2 illustrates a computer system in which at least one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
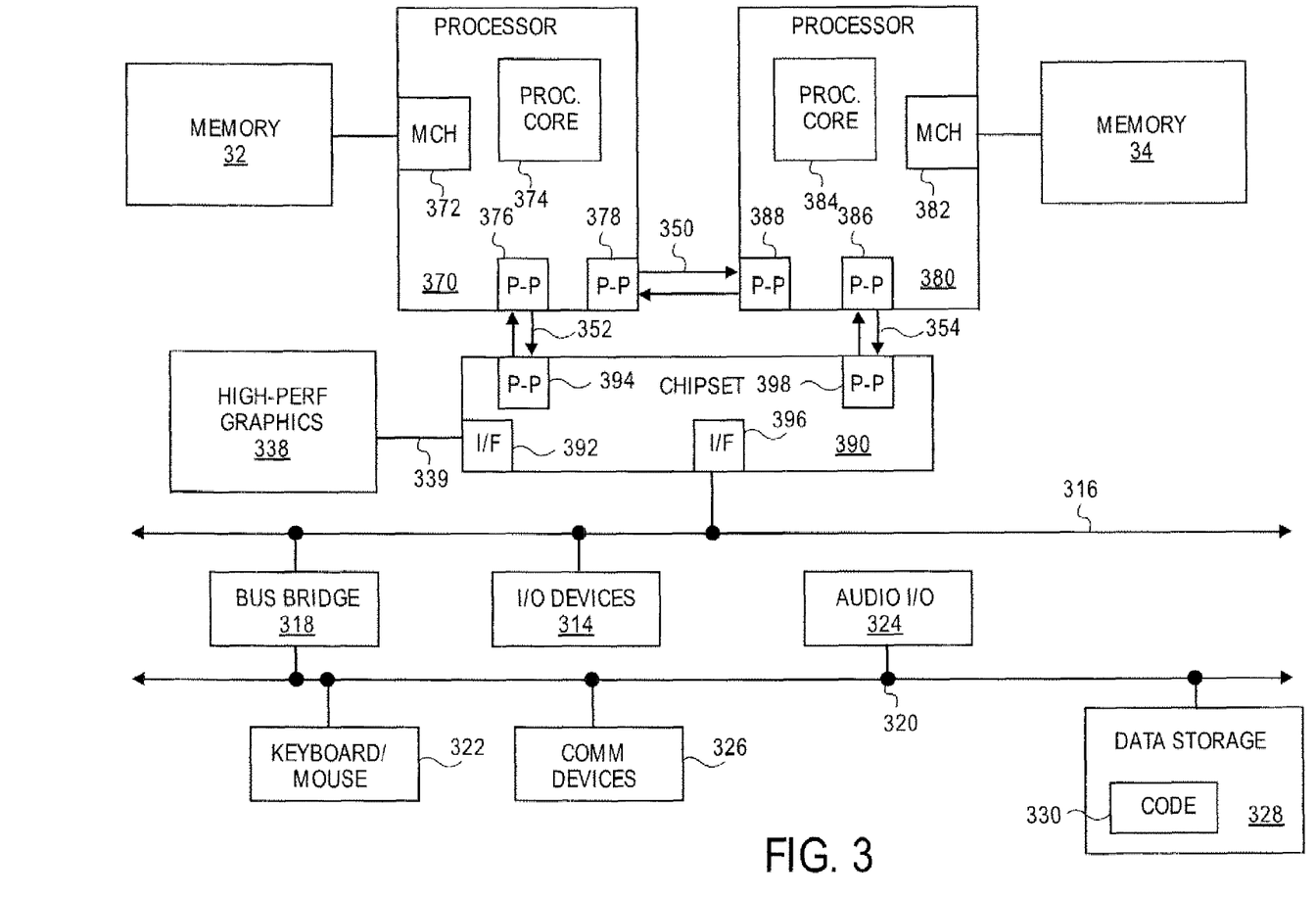
FIG. 3 illustrates a microprocessor in which at least one embodiment of the invention may be used.

FIG. 3 illustrates a computer system that is arranged in a point-to-point (PtP) configuration. In particular, FIG. 3 shows a system where processors, memory, and input/output devices are interconnected by a number of point-to-point interfaces.

The FIG. 3 system may also include several processors, of which only two, processors 370, 380 are shown for clarity.

Processors 370, 380 may each include a local memory controller hub (MCH) 372, 382 to connect with memory 32, 34. Processors 370, 380 may exchange data via a point-to-point interface 350 using point-to-point interface circuits 378, 388. Processors 370, 380 may each exchange data with a chipset 390 via individual point-to-point interfaces 352, 354 using point to point interface circuits 376, 394, 386, 398. Chipset 390 may also exchange data with a high-performance graphics circuit 338 via a high-performance graphics interface 392.

At least one embodiment of the invention may be located within the memory controller hub 372 or 382 of the processors. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
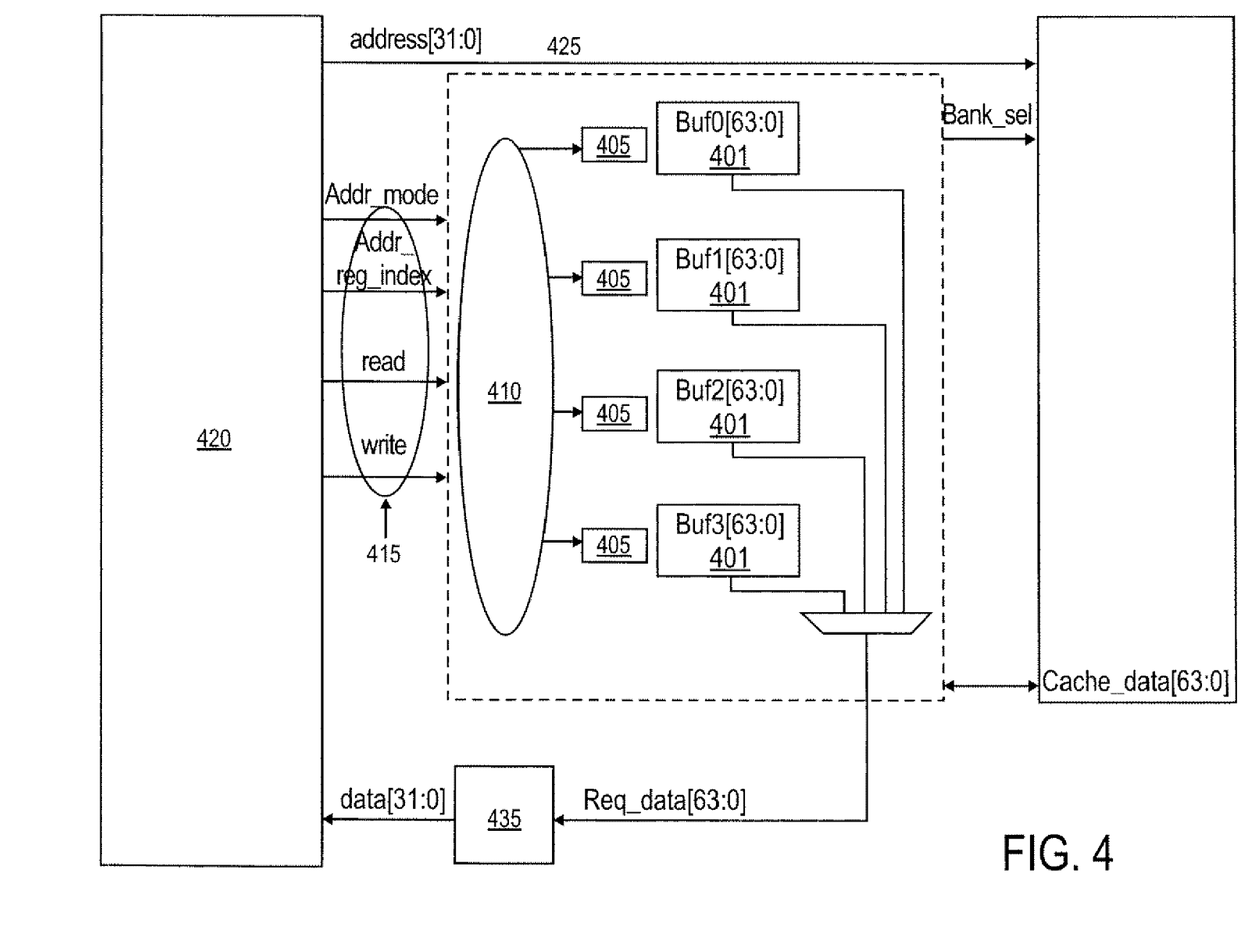
FIG. 4 illustrates a cache architecture according to one embodiment of the invention, in which data buffers are used to store data from prior accesses by a processor.

FIG. 4 illustrates a cache architecture according to one embodiment of the invention, in which data buffers are used to store prior data accessed by a processor. The data buffer entries 401 each have a valid bit 405 associated with them that may be accessed via a buffer control unit 410. The buffer control unit uses control signals 415 from the processor core 420 to access a data buffer and associated valid bit in order to determine whether data addressed by the address lines 425 is available and valid within one of the load buffers. If valid addressed data does exist within the load buffers, the data is returned to the processor via the data lines 430.

In some embodiments of the invention, the data may need to be aligned and signed for a different bit width than that which is stored in the data buffers. The alignment and sign unit 435 accomplishes this in one embodiment of the invention in which the data buffers are 64 bits and the requested data word is only 32 bits. In such an embodiment, the data may be shifted and re-signed to a format compatible with an instruction being executed by the processor.

In the embodiment of the invention illustrated in FIG. 4, the data buffer control unit exploits address information derived from an instruction and reflected within the control lines from the processor. In other embodiments of the invention, the data buffer control unit may exploit information address information derived from an instruction and reflected within the address lines of the processor to access the data buffer entries. Furthermore, in other embodiments of the invention, the data buffer entries may be larger or smaller than 64 bits. In some embodiments, the valid bit may be contained within the data buffer entries themselves or in a table logically mapped to the data buffers entries.

The data buffer entries are updated in at least one embodiment of the invention whenever the data within the entries are no longer valid. Invalid data may result from more recent data being stored ("written") to a corresponding address within the L1 cache or other memory unit within the system. Furthermore, the data buffers may be considered to be invalid if they do not contain data corresponding to a recently accessed memory access by the processor.

In either case, the data within the data buffer may need updated in order for the entries to contain useful data to an instruction executed by the processor. The manner in which the data buffers are updated may depend upon the addressing mode of the processor. For example, in one embodiment of the invention, the address from the processor may be incremented or decremented before or after each memory access. An addressing mode in which the address is incremented prior to a memory access, is typically referred to as "pre-increment" addressing mode. Similarly, an addressing mode in which the address is incremented after a memory access is typically referred to as "post-increment" addressing mode. Conversely, addressing modes in which the address is decremented before or after a memory access are often referred to as "pre-decrement" and "post-decrement" addressing modes, respectively.

In one embodiment of the invention, if the processor changes the memory address in a pre/post increment/decrement addressing mode, the addressed cache line is incremented (for address increment mode) or decremented (for address decrement mode). In such an embodiment, the data buffers may be updated accordingly, depending upon the value or transition of an overflow bit in an address register of the processor.

Figure 5:
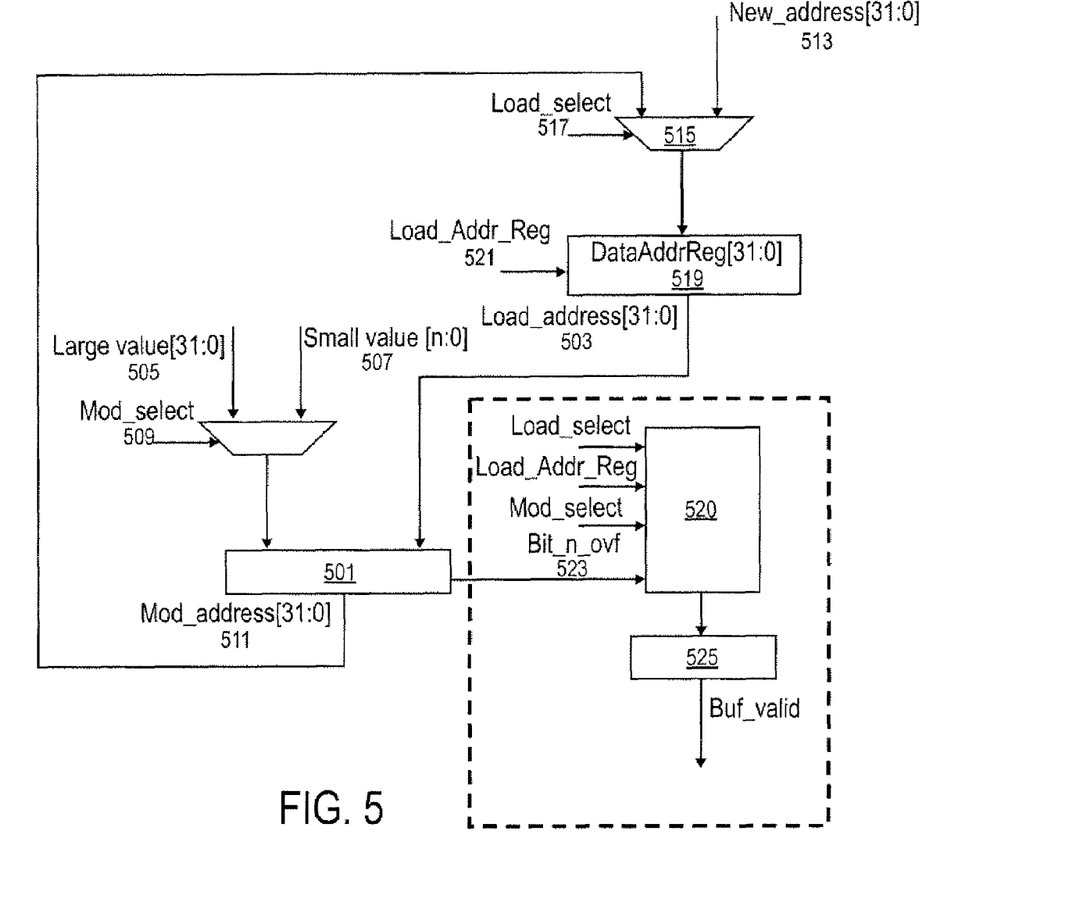
FIG. 5 illustrates a circuit according to one embodiment of the invention for determining whether data stored within a data buffer is valid when using post/pre increment/decrement address register modification.

FIG. 5 illustrates one embodiment of the invention in which the address overflow is detected and used to determine the value of the buffer valid bit for a particular address. In FIG. 5, an address adder unit 501 adds the load address 503 to an address modification value selected from a large value 505 or small value 507 by a MUX 507 and select signal 509. The load address can be selected from either the modified address 511 or a new address 513 by a load register MUX 515 and load select signal 517 and stored in the data address register 519. After a modified load address is stored in the data address register, it may be selected by asserting the load address register signal 521. In other embodiments of the invention, the load address may be derived in other ways, depending upon the addressing architecture of the processor.

Typically, an incremental or decremental immediate operand is used to update the load address that differs from the previous load address by a relatively small value (e.g., one to three or four addressable locations) when the processor is running in pre/post increment/decrement mode. The incrementing or decrementing of the load address may produce an overflow within a processor register storing the result of the increment/decrement of the load address. If the load address is updated by a small amount, an overflow detection unit 520 can detect the overflow bit 523 and determine the proper value to be stored in the buffer valid register 525.

Figure 6:
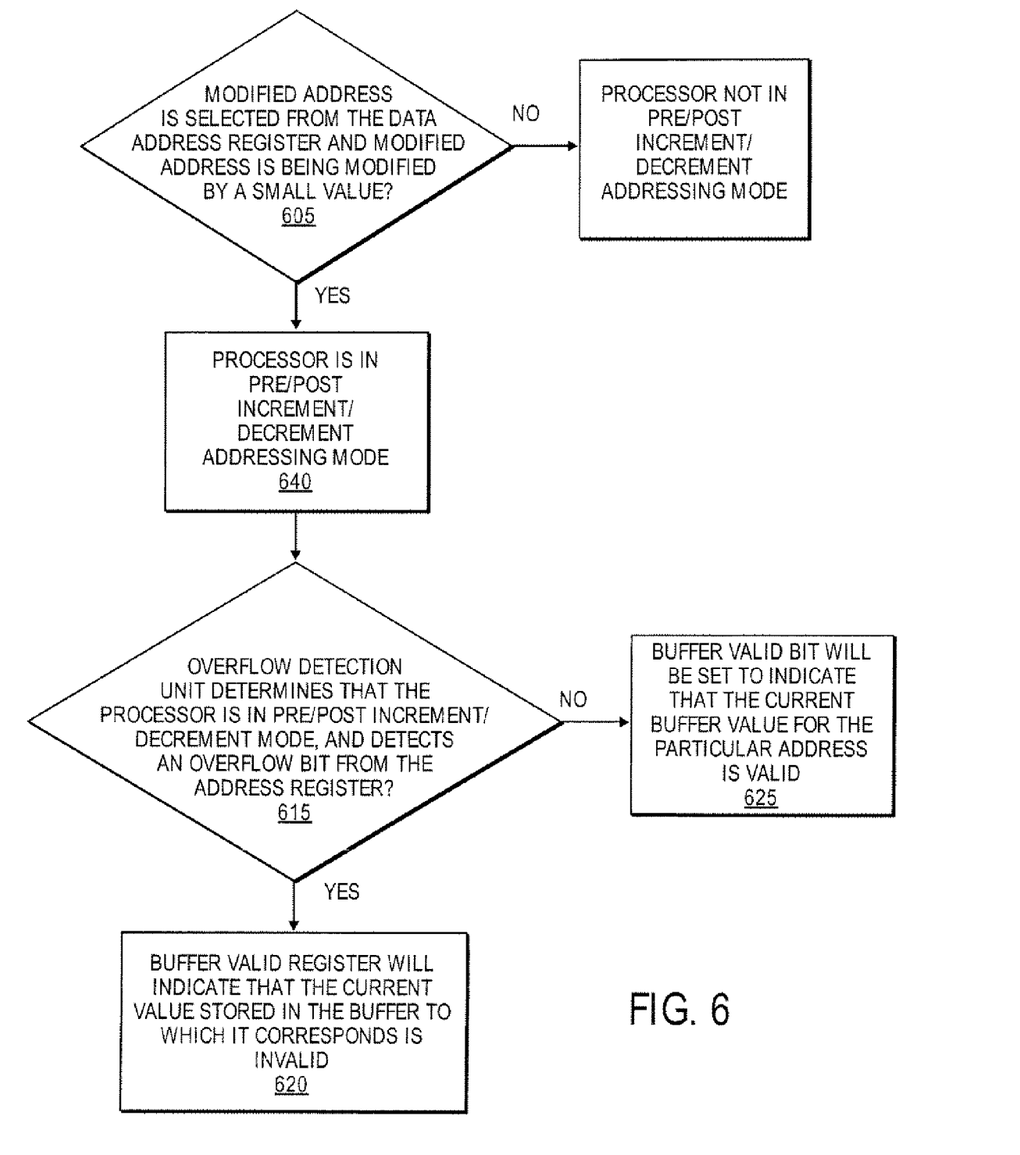
FIG. 6 is a flow diagram illustrating the manner in which an overflow detection unit determines the proper value of a buffer valid bit in one embodiment of the invention.

FIG. 6 is a flow diagram illustrating the manner in which the overflow detection unit of FIG. 5 determines the proper value of the buffer valid bit for a particular address. In one embodiment of the invention, the overflow detection unit uses the load select, load address register, and modification select signals to determine the proper value to be stored within the buffer valid register. In other embodiments of the invention some other combination of signals may be used to determine the proper value of the buffer valid register. In the embodiment illustrated in FIG. 5, the overflow detection unit implements an algorithm that uses these inputs to determine whether a modified address is being used for the load address rather than a new address, whether the load address has been updated within the load address register, and whether the load address is being modified by a small value or large value.

Referring to FIG. 6, if the overflow detection unit determines that a modified address is selected from the data address register and that the modified address is being modified by a small value, at operation 605, the overflow detection circuit will deduce that the processor is in pre/post increment/decrement addressing mode 610. If the overflow detection unit determines that the processor is in pre/post increment/decrement mode, and it also detects an overflow bit from the address register at operation 615, the buffer valid register will indicate that the current value stored in the buffer to which it corresponds is invalid, at operation 620, and therefore should be updated with more current data. However, if no overflow detection signal is detected and the overflow detection unit determines that the processor is in pre/post increment/decrement addressing mode, the buffer valid bit will be set to indicate that the current buffer value for the particular address is valid, at operation 625, and therefore no update is necessary.

Figure 7:
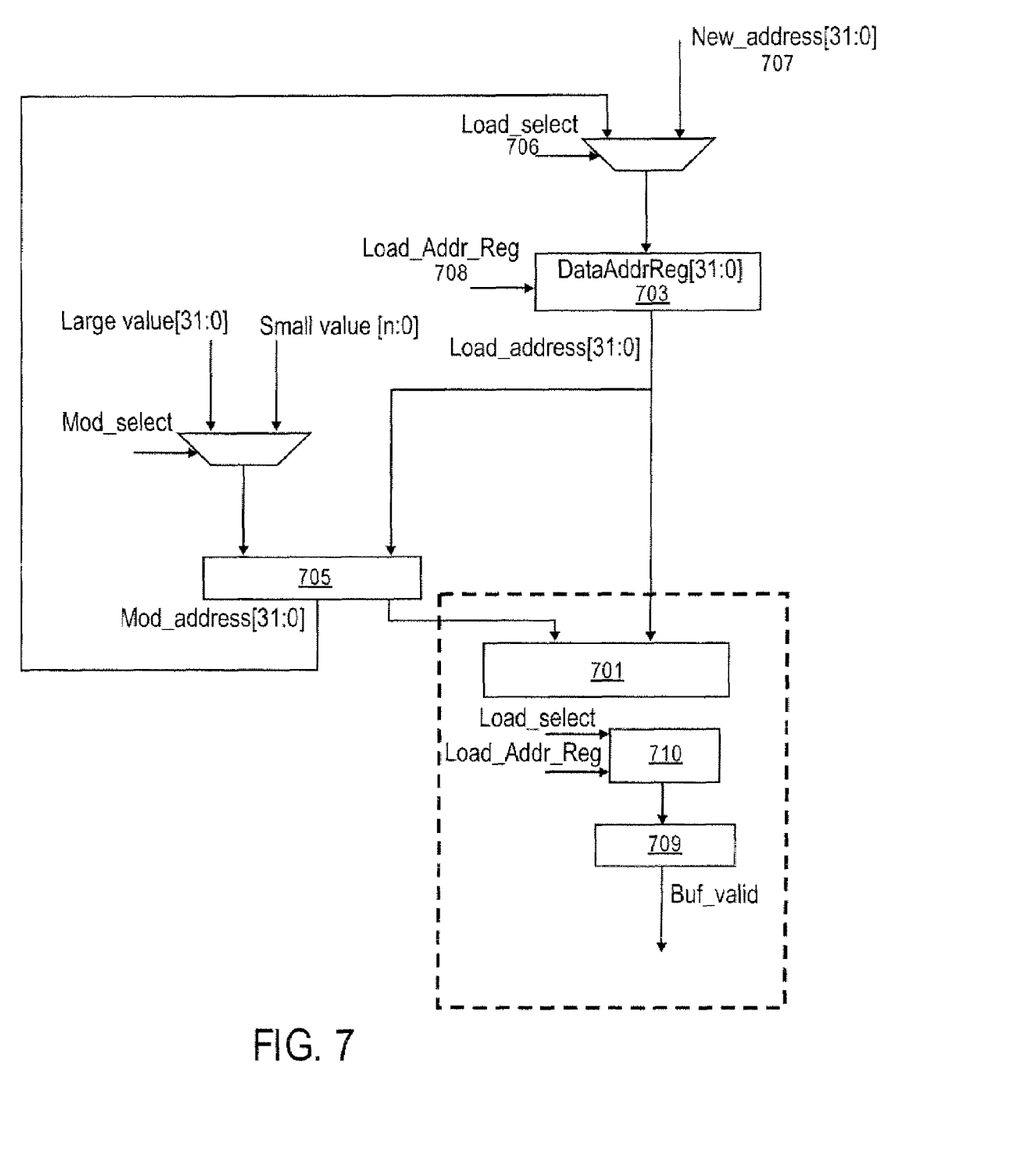
FIG. 7 illustrates a circuit according to one embodiment of the invention for determining whether data stored within a data buffer is valid when using an arithmetic operation to modify an address register.

If the immediate operand used to increment or decrement the address is not small or, for example, the operand is an immediate value provided by a register, then the load buffers may be updated in a different manner in some embodiments of the invention. FIG. 7 illustrates one embodiment of the invention in which the immediate operand used to change the value of the load address is not small or is provided by another register.

Referring to FIG. 7, an address compare unit 701 compares the address stored within the data address register 703 with the address adder 705 output to determine if there is a match. If there is not a match and the buffer validation logic 710 determines that the load select signal 706 indicates that a new address 707 is selected, and if the load address register signal 708 indicates that the new address is loaded into the data address register, the buffer valid register 709 is set to indicate that the buffer data to which the address corresponds is not valid. Otherwise, the buffer valid register reflects that the buffer data is valid.

In other embodiments of the invention, the contents of the data address register may be determined using a mask and the validity of the corresponding buffer entry may be determined according to the Boolean equation: Valid=(old_value AND mask_value==new_value AND mask_value), where "old_value" represents the previous address and "new_value" represents the newly generated address. "Mask_value" is a value that when logically AND'ed with old_Value generates the same result as when AND'ed with new_value when the two values are the same.

In the event that data is written to a location in memory, such as to the L1 cache, the load buffer data corresponding to that location should be invalidated so that it is not used by subsequent load operations. In one embodiment of the invention, whenever data is written to any memory location corresponding to data stored in one of the load buffers, all of the load buffers are invalidated by modifying each of the respective load buffer valid bits. In other embodiments, only the load buffer corresponding to the location in memory being written is invalidated.

Figure 8:
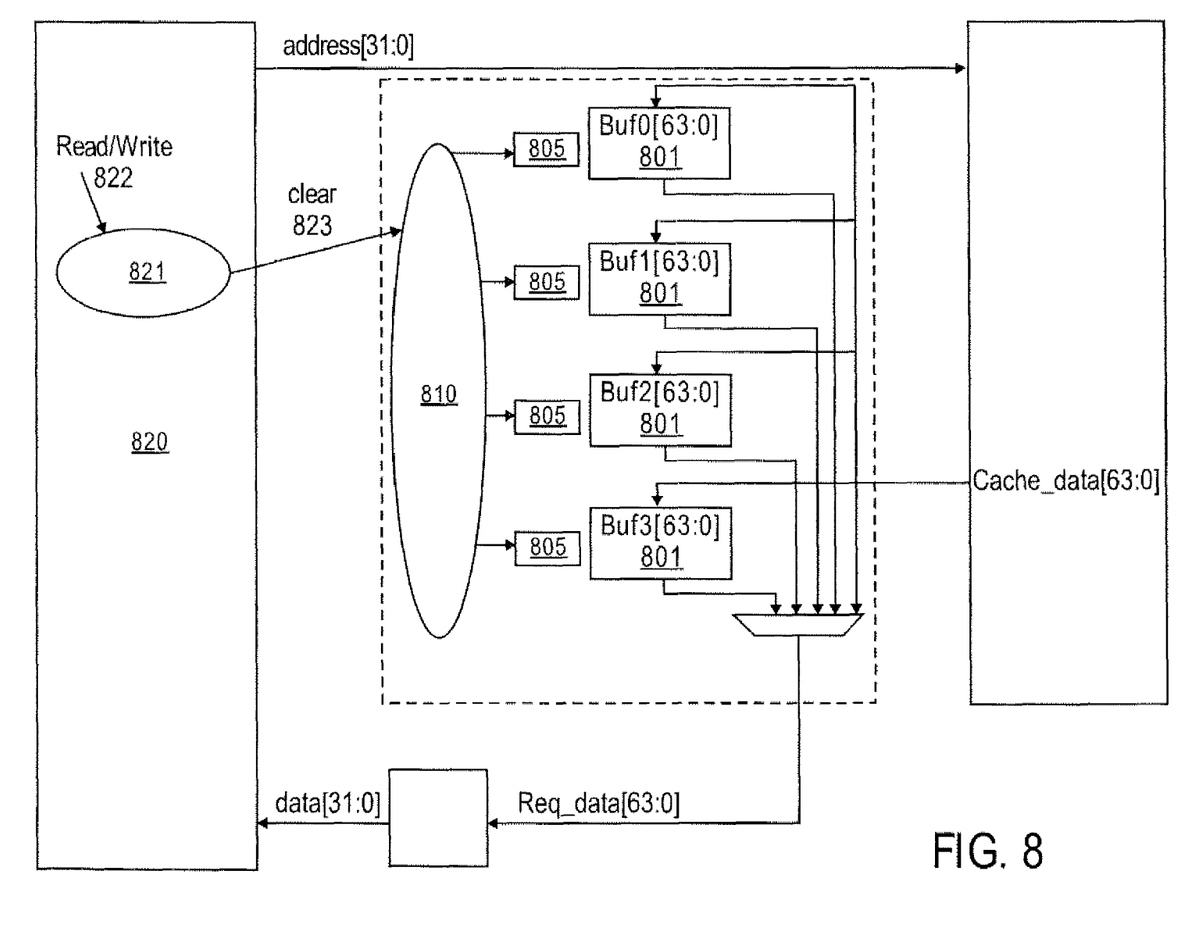
FIG. 8 illustrates a circuit according to one embodiment of the invention to invalidate buffer data every time there is a write operation by a processor to a cache.

FIG. 8 illustrates one embodiment of the invention in which all of the load buffers are invalidated by a write operation to a memory location corresponding to any of the load buffers. In the embodiment illustrated in FIG. 8, a read/write detection unit 821 detects whether a read or a write is being performed by the processor core 820 by detecting the read/write signal 822. If a write is performed, the clear signal 823 is asserted to the buffer control unit 810, which then indicates invalid data in each buffer entry validity indicator 805 corresponding to the data buffers 801.

Figure 9:
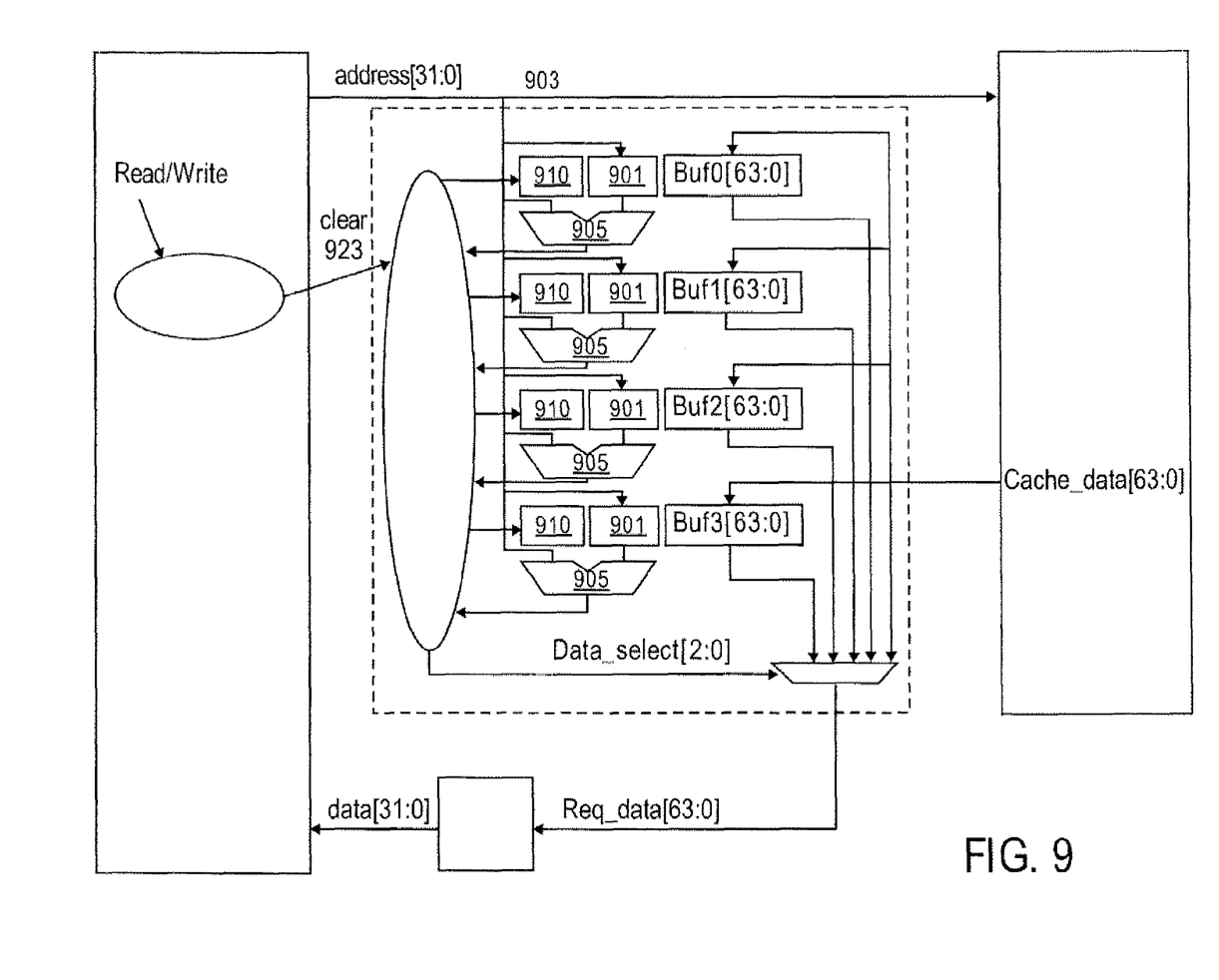
FIG. 9 illustrates a circuit according to one embodiment of the invention to invalidate buffer data when there is an address tag compare match.

FIG. 9 illustrates one embodiment of the invention, in which only the load buffer entry containing data corresponding to the write address is invalidated when there is a write operation by the processor. In FIG. 9, each of the load buffers has associated with it a tag storage unit 901, which typically stores a portion of the address 903. Also associated with each load buffer is a comparator 905 to compare the tag stored in the tag storage unit with the corresponding bits of the write address. If there is a match and the clear signal 923 is asserted, indicating that the address corresponds to a write operation, the corresponding invalid/valid bit 910 is set to a value to reflect that the corresponding load buffer value is not longer valid data.

Figure 10:
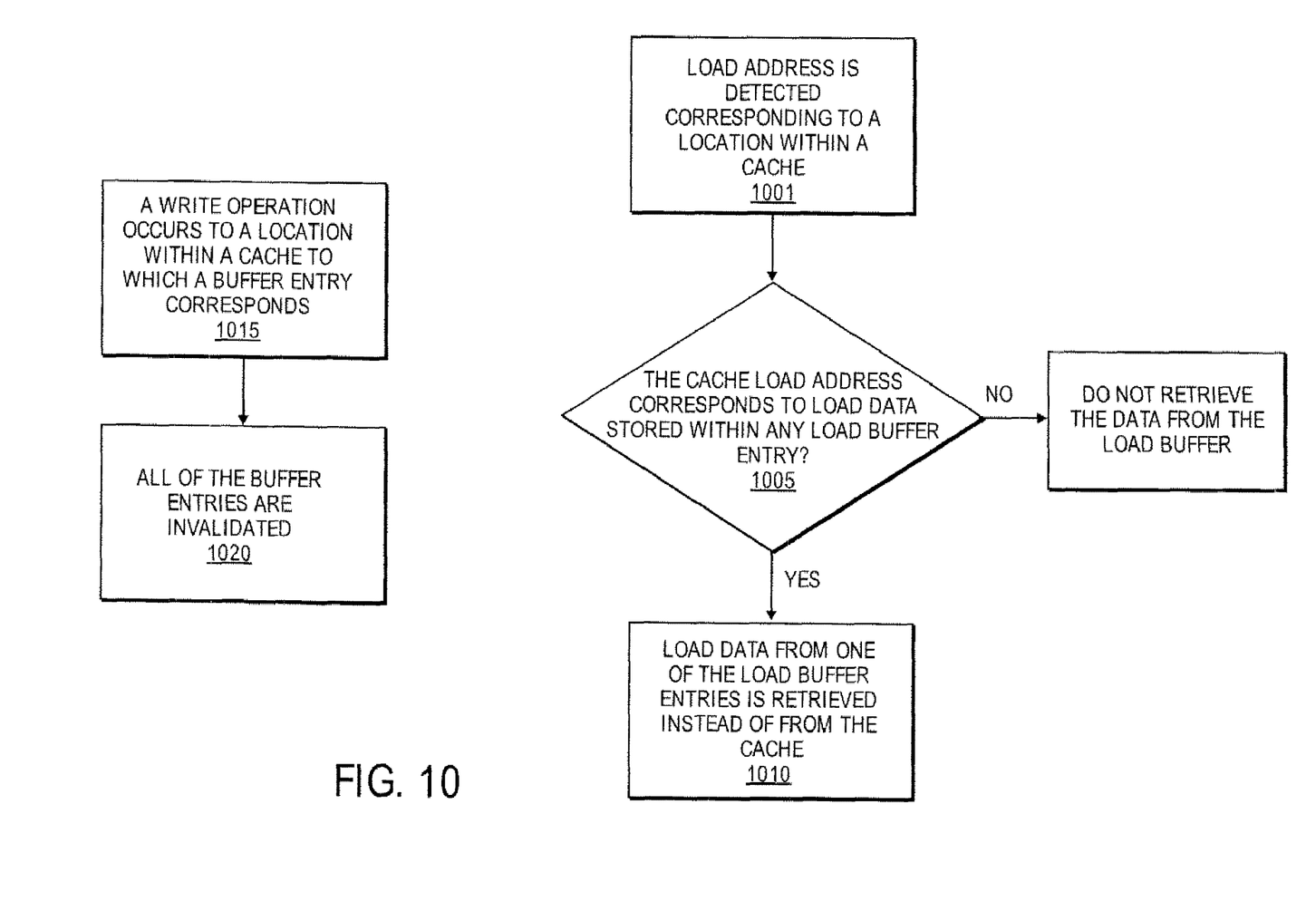
FIG. 10 is a flow diagram illustrating operations to perform at least one embodiment of the invention.

FIG. 10 is a flow diagram illustrating operations involved in the performance of at least one embodiment of the invention. At operation 1001, a load address is detected corresponding to a location within a cache. A determination is made as to whether the cache load address corresponds to load data stored within any load buffer entry at operation 1005. If the cache load address corresponds to load data stored within any of the load buffer entries, load data from one of the load buffer entries is retrieved instead of from the cache at operation 1010.

At operation 1015 a write operation occurs to a location within a cache to which a buffer entry corresponds. In one embodiment of the invention, all of the buffer entries are invalidated at operation 1020 in response to the write operation of operation 1015. In another embodiment of the invention, only the buffer entry corresponding to the write location within the cache is invalidated.

Any or all portions of the embodiments of the invention illustrated herein may be implemented in a number of ways, including, but not limited to, logic using complimentary metal-oxide-semiconductor (CMOS) circuit devices (hardware), instructions stored within a storage medium (software), which when executed by a machine, such as a microprocessor, cause the microprocessor to perform operations described herein, or a combination of hardware and software. References to "microprocessor" or "processor" made herein are intended to refer to any machine or device that is capable of performing operations as a result of receiving one or more input signals or instructions, including CMOS devices.

Although the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A system comprising:
   a memory unit to store a load instruction;
   a processor to execute the load instruction and to decode information within the load instruction in order to retrieve load data addressed by the load instruction from a load buffer, the load buffer comprising a plurality of load buffer entries associated with a plurality of cache entries of a cache such that the load data may be retrieved from the plurality of load buffer entries instead of from the cache entries, the processor further comprising a load buffer control unit to detect whether a load address to index locations within the cache corresponds to data stored within any of the plurality of load buffer entries, and if so, to select data within the plurality of load buffer entries to which the load address corresponds based at least in part on an overflow bit in an address register of the processor.

2. The system of claim 1 further comprising validation indicators to indicate whether data stored within the load buffer entries is valid.

3. The system of claim 2 wherein the validation indicators are to indicate that data within all of the load buffer entries is invalid if the processor has performed or will perform a write operation to a location within the cache to which a load buffer entry corresponds.

4. The system of claim 2 wherein the validation indicators are to indicate that data within a load buffer entry is invalid if the processor has performed or will perform a write operation to a location within the cache to which the load buffer entry to be indicated as invalided corresponds.

5. The system of claim 4 wherein the execution of the load instruction is to cause the load address to be modified by an incremental amount.

6. The system of claim 4 wherein the execution of the load instruction is to cause the load address to be modified according to an arithmetic operation.

7. The system of claim 4 wherein the execution of the load instruction is to cause the load address to be modified according to a register assignment.

8. The system of claim 1, further comprising an overflow detection unit to determine a value for a validation indicator associated with a load buffer entry.

9. The system of claim 8, wherein the overflow detection unit is to receive a load select signal, a load address register signal, a modification select signal, and the overflow bit and to determine the value for the validation indicator.

10. A method comprising:
   detecting a load address corresponding to a location within a cache;
   determining whether the load address corresponds to load data stored within any of a plurality of load buffer entries, including detecting whether the load address corresponds to a buffer entry address by detecting an overflow bit in an address register storing the load address;
   retrieving a load data from one of the plurality of load buffer entries instead of from the cache if the load address corresponds to load data stored within any of the plurality of load buffer entries.

11. The method of claim 10 wherein the detection of whether the load address corresponds to a buffer entry address comprises performing a mask operation to a register storing the load address.

12. The method of claim 10 wherein the detection of whether the load address corresponds to a buffer entry address comprises performing an address compare operation between a portion of the load address and a buffer entry address.

13. The method of claim 10 further comprising invalidating all of the plurality of load buffer entries if a write operation occurs to a cache address corresponding to a load buffer entry address.

14. The method of claim 10 further comprising invalidating only one load buffer entry if a write operation occurs to a cache address to which the load buffer entry to be invalidated corresponds.

15. An apparatus comprising:
   a processor core to provide control signals to a buffer control unit;
   the buffer control unit coupled to the processor core to receive the control signals and to access a plurality of load buffers that store prior data accessed by the processor core, the plurality of load buffers coupled to the buffer control unit and each associated with a valid indicator, wherein the buffer control unit is to detect a load address corresponding to a location within a cache memory, determine whether the load address corresponds to load data stored within any of the plurality of load buffers by detection of an overflow bit in an address register storing the load address, and retrieve a load data from one of the plurality of load buffers instead of from the cache memory if the load address corresponds to load data stored within any of the plurality of load buffers;
   the cache memory coupled to the processor core and the plurality of load buffers.

16. The apparatus of claim 15, further comprising an overflow detection unit to determine a value for the valid indicator.

17. The apparatus of claim 16, wherein the overflow detection unit is to receive a load select signal, a load address register signal, a modification select signal, and the overflow bit and to determine a value for the valid indicator.

* * * * *